Aug. 7, 1928.
M. W. WYSONG
1,679,700
UNIVERSAL JOINT
Filed Feb. 18, 1926
5 Sheets-Sheet 1
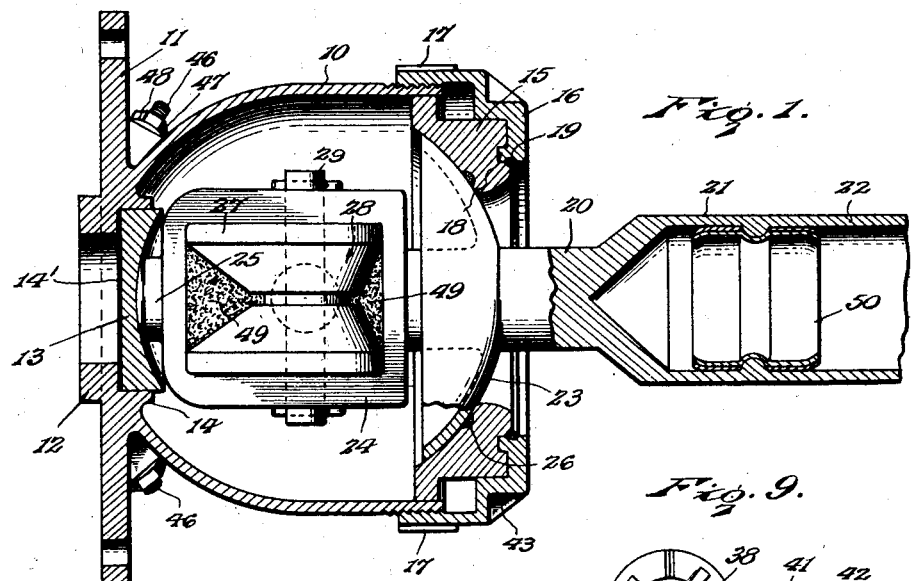
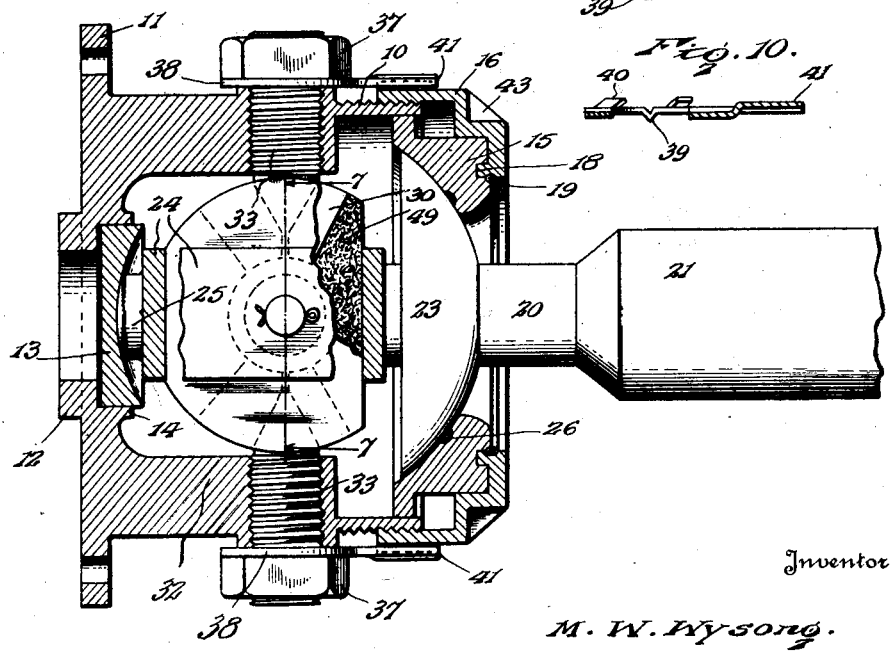
Inventor
M. W. Wysong.
By Lacy & Lacey, Attorneys Aug. 7, 1928.
M. W. WYSONG
UNIVERSAL JOINT
Filed Feb. 18, 1926    5 Sheets-Sheet 2
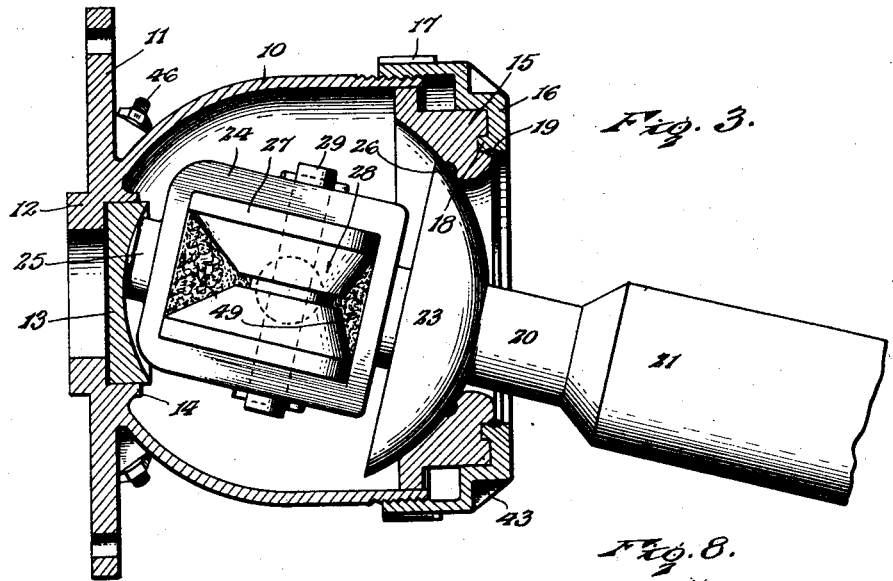
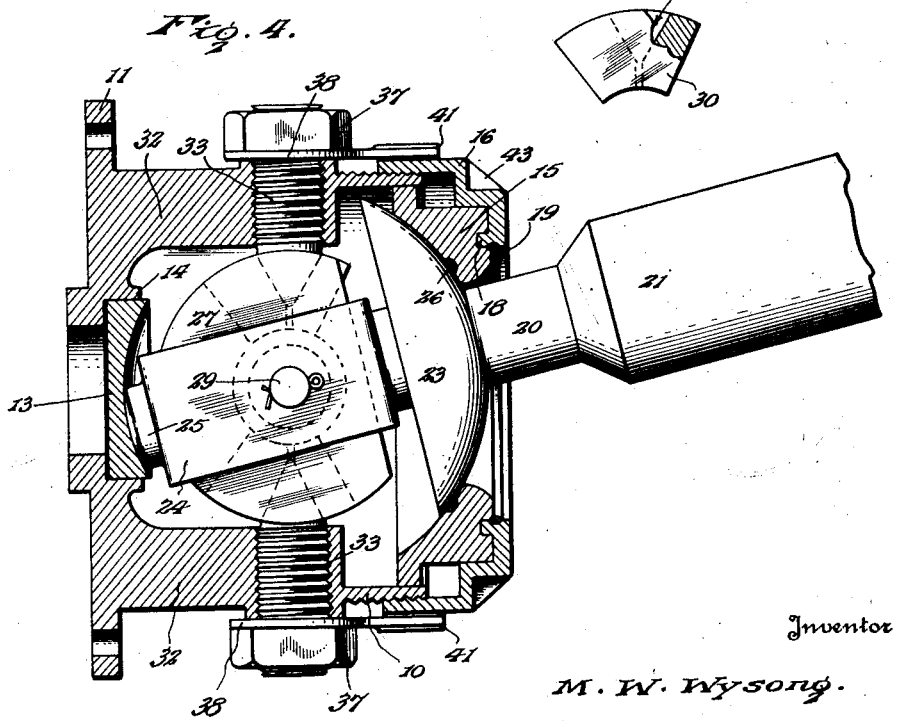
Inventor
M. W. Wysong.
By Lacy & Lacy, Attorneys Aug. 7, 1928.
M. W. WYSONG
1,679,700
UNIVERSAL JOINT
Filed Feb. 18, 1926    5 Sheets-Sheet 3
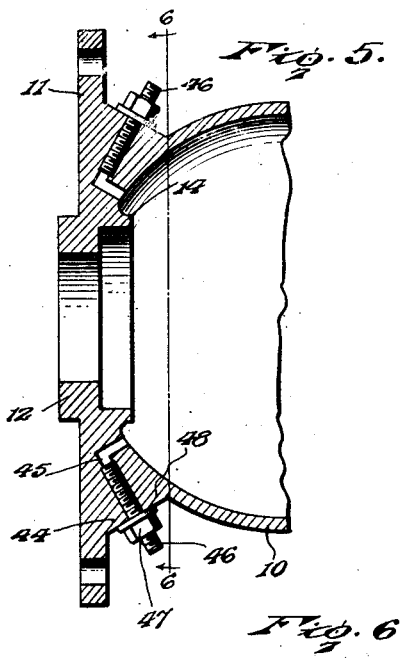
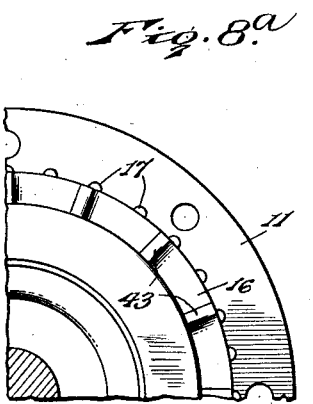
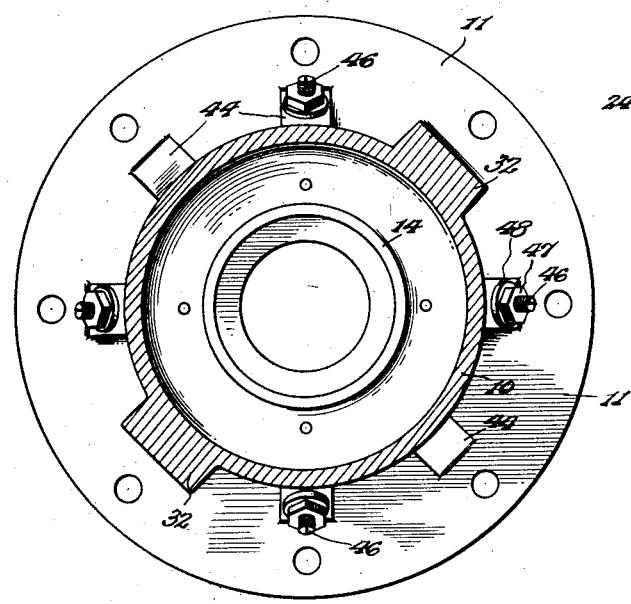
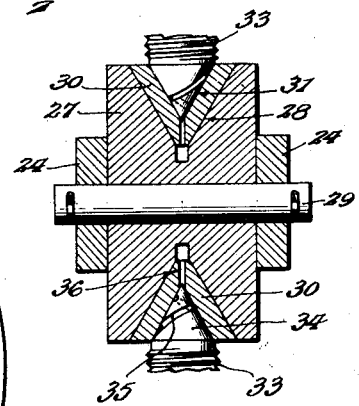
Inventor
M. W. Wysong.
By
Attorney

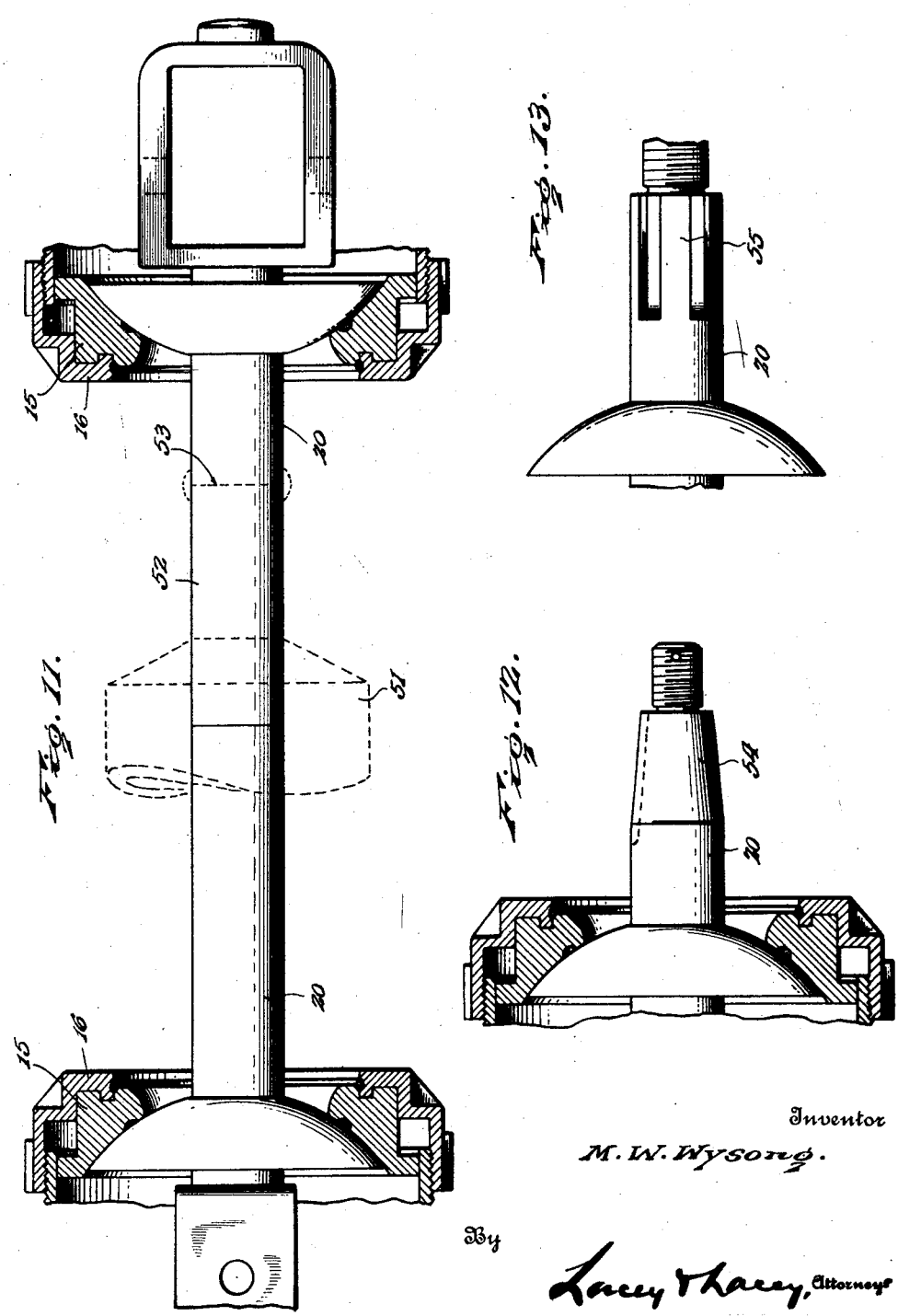

Aug. 7, 1928.                    1,679,700
M. W. WYSONG
UNIVERSAL JOINT
Filed Feb. 18, 1926        5 Sheets-Sheet 5
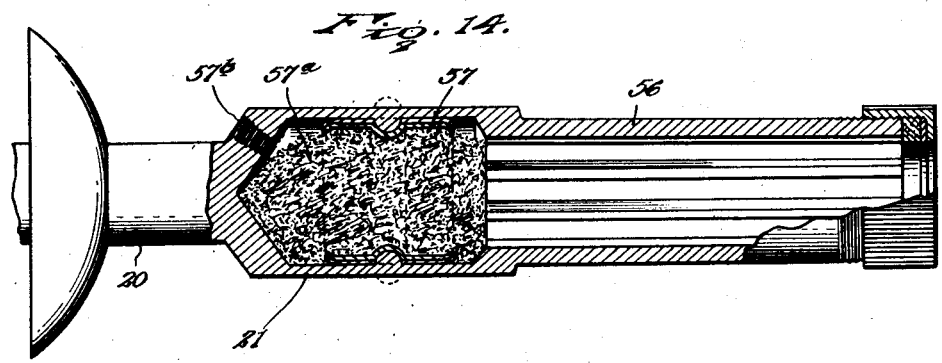
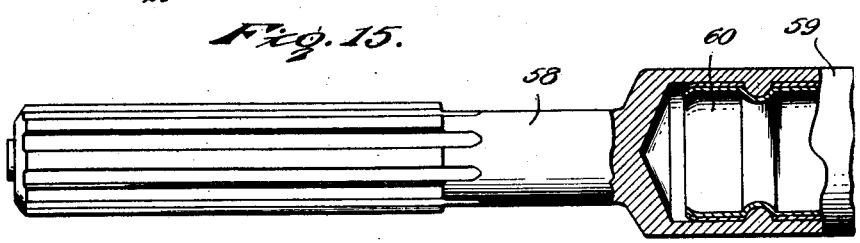
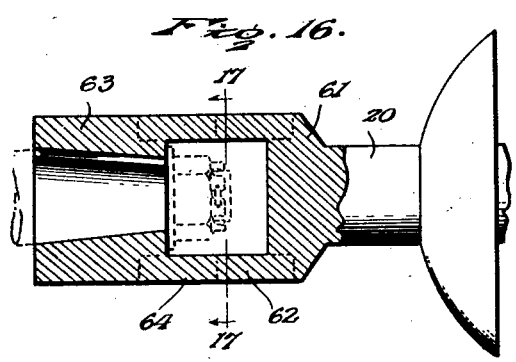
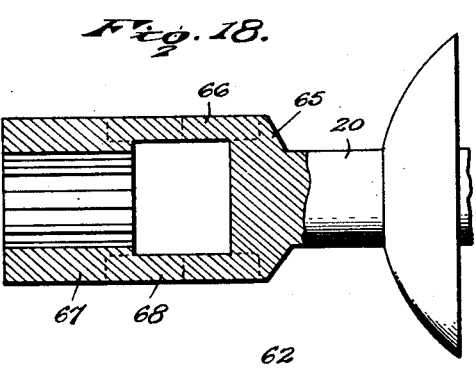
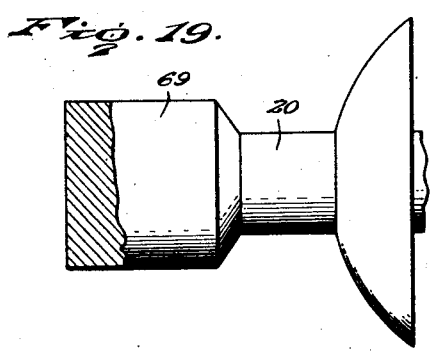
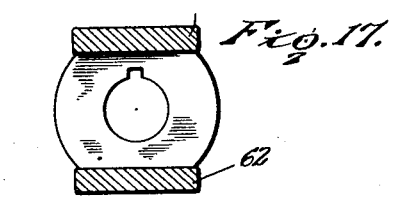
Inventor
M. W. Wysong.
By
Lacy & Lacy, Attorneys Patented Aug. 7, 1928.

1,679,700

UNITED STATES PATENT OFFICE.

MAXWELL W. WYSONG, OF NORTH PLAINFIELD, NEW JERSEY, ASSIGNOR OF ONE-HALF TO HERBERT C POOLE, OF NEWARK, NEW JERSEY.

UNIVERSAL JOINT.

Application filed February 18, 1926. Serial No. 89,149.

This invention relates to an improved universal joint especially designed for use in connection with motor vehicles, motor boats, railway cars, power units, or the like, and seeks, among other objects, to provide a joint wherein the joint shaft will be slidably supported to rock about one axis and pivotally supported to rock about another axis, the axes being maintained always at right angles to each other to thus insure a substantially perfect functioning of the joint A further object of the invention is to provide a joint which may be adjusted to take up wear on the bearing surfaces of the relatively movable parts of the joint so that any undue looseness in any direction may be effectually eliminated.

Still another object of the invention is to provide a joint which may be balanced to a nicety.

And the invention seeks, as a still further object, to provide a joint which will be self-lubricating and which will be oil-tight as well as dust-proof.

Other objects of the invention not specifically mentioned in the foregoing, will appear during the course of the following description.

In the accompanying drawings:

Figure 1 is a vertical longitudinal sectional view through my improved joint.

Figure 2 is a vertical longitudinal sectional view through the joint at a right angle to the section of Figure 1.

Figure 3 is a view similar to Figure 1, and showing the movement of the joint shaft in one plane.

Figure 4 is a view similar to Figure 2, and showing the movement of the joint shaft in a plane at a right angle to the plane of movement shown in Figure 3.

Figure 5 is a fragmentary sectional view through the joint shell and showing the balancing pins.

Figure 6 is a transverse sectional view on the line 6—6 of Figure 5, looking in the direction indicated by the arrows.

Figure 7 is a detail sectional view through the joint and particularly showing the shoes employed.

Figure 8 is a detail elevation of one of the shoes.

Figure 8ª is a fragmentary elevation particularly showing the reinforcing webs on the end cap of the joint.

Figure 9 is a plan view of a typical locking washer employed.

Figure 10 is a longitudinal sectional view through the washer.

Figure 11 is a fragmentary sectional view showing how the shafts of a pair of the joints may be joined to afford a short connection for special machines, this view also illustrating, in dotted lines, the manner in which an extra large shaft tubing may be connected to the shaft of a joint.

Figure 12 is a fragmentary sectional view showing the joint shaft formed with a tapered terminal.

Figure 13 is a fragmentary elevation showing the joint shaft formed with a splined terminal.

Figure 14 is a fragmentary elevation partly broken away and shown in section to illustrate the manner in which a spline sleeve may be connected to the joint shaft to receive a spline shaft.

Figure 15 is a fragmentary elevation showing a spline propeller shaft adapted to fit in the sleeve shown in Figure 14.

Figure 16 is a fragmentary elevation broken away and shown in section to illustrate the manner in which the joint shaft may be provided with a tapered socket terminal.

Figure 17 is a sectional view on the line 17—17 of Figure 16, looking in the direction indicated by the arrows.

Figure 18 is a view similar to Figure 16 and illustrating the manner in which the joint shaft may be provided with a spline socket terminal.

Figure 19 is a detail view partly in elevation and partly in section and showing the joint shaft as provided with a solid terminal.

In carrying the invention into effect, I employ a cylindrical shell 10 which is rounded at one end and provided with a radial flange 11 apertured to receive bolts or other suitable fastening devices connecting the shell with a driving element. Surrounding an axial opening at the adjacent end of the shell is a pilot flange 12 and said opening is counterbored at its inner end to form a seat for a bearing cup 13 having a spherical inner face, the shell being provided with an internal flange 14 to surround the cup. The cup is, of course, rigidly fixed in position and disposed behind the cup is a shim 14′.

Slidably fitting in the open end of the shell is a companion annular bearing cup 15 having a spherical inner face, and mating with said cup is an end cap 16 screwed over the shell, the cap being provided with a series of circumferentially spaced ribs 17 extending parallel to the axis of the cap. As will be observed, the cap is stepped to snugly surround the cup, and formed on the cap at its inner circumference is an inturned annular flange 18 while the cup is channeled annular flange 1 while the cup is channeled at its outer end to snugly receive said flange. Uniting the cap and cup is a ring of solder 19 lying in the angle between the flange 18 and the outer end face of the cup.

Extending into the shell is a shaft 20 shown in Figures 1, 2, 3 and 4 of the drawings as provided with a head or terminal 21 to which is connected a driven element or propeller shaft, as indicated at 22. Integral with the shaft 20 is a substantially hemispherical bearing flange or member 23 fitting the spherical inner face of the cup 15, and formed on the shaft at its inner end is a closed rectangular yoke 24. Rising from the inner end bar of said yoke is a knob-like bearing member 25 which is provided with a spherical end face to fit the spherical inner face of the cup 13 so that, as will be seen, the bearing members 23 and 25 of the shaft are thus confined between the cups 13 and 15 for supporting the shaft in centered relation within the shell. Formed in the inner face of the cup 15 is an annular groove in which is seated an appropriate gasket 26 which coacts with the bearing member 23 for excluding dust as well as retaining lubricant within the shell 10.

Snugly fitting in the yoke 24 of the shaft 21 is a spool-shaped core 27 having a central V-shaped groove 28 and, as shown in Figure 2, the core is cut away at the front and rear thereof, along parallel planes, to be snugly received between the end bars of the yoke. Extending transversely through the side bars of the yoke and through said core is a center pin 29 rigidly connecting the core with the yoke and secured against endwise displacement by suitable keys. This pin intersects the axis of the shaft 20 at right angles and the groove 28 of the core is accurately formed to extend in concentric relation to the axis of said pin. Slidably fitting in the groove 28 of the core are companion segmental shoes 30, one of which is shown in detail in Figure 8. These shoes are substantially V-shaped in cross section to lie flat against the side walls of said groove and formed in the shoes are conical sockets 31.

Formed on the shell 10 at opposite sides thereof, as seen in Figure 2, are bosses 32, and screwed through said bosses are pivot pins 33 which, as shown in Figure 7, are provided with conical inner terminals 34 fitting in the sockets 31 of the shoes 30. These terminals are provided with oil grooves 35, and leading into the inner ends of the sockets 31 are passages 36 so that lubricant may readily enter said sockets to flow into the grooves 35 for lubricating said terminals. Screwed on the outer ends of the pins 33 are lock nuts 37 and clamped beneath said nuts are locking washers 38, a typical one of which is shown in Figures 9 and 10 of the drawings. These washers are preferably struck from suitable resilient sheet metal and are provided with radial V-shaped ribs 39 to coact with the bosses 32 as well as with spring tongues 40 to coact with the nuts so that said washers will thus function to securely lock the nuts in adjusted position. Projecting from the washers are radial spring lugs 41 overlying the end cap 16 and pressed from said lugs are sockets 42 to selectively receive the ribs 17 of said cap. Thus, as will be perceived, the washers 38 will, in addition to locking the nuts 37, also function to lock the end cap in adjusted position. Formed on the end cap, as seen in Figure 8$^a$, is a series of circumferentially spaced webs 43 which not only serve to reinforce said cap but are so disposed that a spanner wrench may be engaged with said lugs for adjusting the cap.

Lying in the angle between the shell 10 and flange 11 is a series of spaced reinforcing webs 44 and formed through certain of said webs to enter the shell are passages 45 through which lubricant may be introduced into the shell. Screwed into the outer ends of said passages are balancing pins 46 closing said passages. As will be perceived, these pins may be adjusted for balancing the shell with respect to its axis of rotation, and screwed on said pins are lock nuts 47 secured in adjusted position by appropriate locking washers 48. In use, the shell is filled preferably about two-thirds full with heavy grease, and positioned in the groove 28 of the core 27 between the ends of the shoes 30 are fibrous packings 49 which are saturated with light lubricating oil. Thus, the joint is well lubricated and, of course, when the joint is rotated, the grease and oil will be thrown about within the joint by centrifugal force for maintaining the joint lubricated. Furthermore, as the shaft 20 is rocked about the axis of the pin 29, the packings 49 will be alternately compressed and released by the shoes 30 so that the light lubricating oil will be alternately pressed from said packings and drawn up thereby, to be thus pumped about within the joint for maintaining the parts lubricated.

As will now be seen in view of the foregoing description, the shoes 30 may turn on the pins 33 so that said pins will pivotally support the shaft 20 to rock in one plane about the axes of said pins. Furthermore, as will be seen, the shoes 30 may slide within the groove 28 of the core 27 so that said shoes, in conjunction with the pins 33, will slidably support the shaft 20 to rock about the axis of the pin 29 in a plane at a right angle to the former plane of movement of the shaft, and attention is now directed to the fact that the pins 33 and shoes 30, in conjunction with the bearing members 23 and 25 and bearing cups 13 and 15, will function to centralize the shaft with respect to the shell and maintain the two axes of movement of the shaft at a right angle to each other. Practically ideal functioning of the joint is thus assured. By adjustment of the cap 16 inwardly on the shell 10, the bearing cup 15 may be advanced to take up wear on the bearing members 23 and 25 as well as wear on said cup and the cup 13 and, if necessary, one or more additional shims may be inserted behind the cup 13 for maintaining the axis of the pin 29 in the plane of the axes of the pins 33. Similarly, the pins 33 may be adjustably advanced for taking up wear on the core 27 and shoes 30 as well as on the terminals 34 of said pins. Accordingly, provision is made whereby any looseness occurring between any of the bearing surfaces of the joint may be taken up so that, throughout the period of service of the joint, lost motion may be readily eliminated.

The shaft terminal 21, as illustrated in Figures 1, 2, 3 and 4 of the drawings, is hollow to mate with the tubular shaft 22, and the shafts are welded together in accordance with the process set forth in my co-pending application filed February 18, 1926, Serial No. 89,151, for flash butt-welded joint and process of welding same, a core, as indicated at 50, being employed. This core has also been made the subject of a separate application, filed February 18, 1926, Serial No. 89,150.

In Figure 11 of the drawings, I have shown the manner in which the shafts of a pair of joints may be joined to afford a short connection for special machines. As illustrated, the cups 15 and caps 16 are first assembled upon the joint shafts 20, when the shafts are electrically butt-welded at their free ends for integrally uniting the shafts. It is, as will be seen, imperative that before the shafts are welded, the cups 15 and caps 16 be assembled upon the shafts since otherwise it would be impossible to arrange these parts in place. In any instance where an extra large tubing such, for instance, as illustrated in dotted lines at 51, is to be welded to the shaft of a joint, a stub shaft 52 is first welded to one end of the tubing, when the stub shaft may then be welded, as shown at 53, to the shaft of the joint.

In Figure 12 of the drawings, the joint shaft 20 is shown as formed with a tapered terminal 54 having a suitable keyway, while in Figure 13, the shaft 20 is shown as formed with a spline terminal 55, and, as will be understood, the terminal 55 may be provided with any approved number of splines.

In Figure 14, I have shown the manner in which a spline sleeve 56 may be attached to the head 21 of the joint shaft to provide the shaft with a splined sleeve terminal. The sleeve is first broached when the sleeve is electrically butt-welded, in accordance with my improved process, to said head, a core 57, like the core 50, being employed. Disposed in the cavity at the inner end of the sleeve is a felt or other pliable packing 57ª, and screwed through the wall of the head at the inner end of said cavity is a filler plug 57ᵇ. The cavity is filled with heavy grease and the packing saturated with light lubricating oil, the filler plug being provided so that additional oil may be conveniently introduced from time to time as may be required. Figure 15 shows a spline shaft 58 adapted to fit in the sleeve 56, the shaft 58 being welded, in accordance with my improved process, to one end of a propeller shaft 59, a core 60, like the core 50, being employed. The sleeve 56, as well as the shaft 58 may, of course, be provided with any approved number of splines, and, as will now be seen, as the shaft shifts in the sleeve, the oil and grease will be pumped or forced about and between the splines. Thus, the parts will, almost indefinitely, be thoroughly lubricated automatically while dust and grit will be excluded.

In Figures 16 and 17, I have shown the joint shaft 20 as formed with a head 61 having parallel side lugs 62, and fixed to said head is a tapered socket 63 having a suitable keyway and provided with side lugs 64 electrically butt-welded to the lugs 62. The shaft is thus provided with a tapered socket terminal and, as shown in dotted lines a Figure 16, the space between the inner end of the socket and the head 61 is amply sufficient to accommodate a nut securing one end of a propeller shaft in said socket. In Figure 18, the joint shaft 20 is shown as provided with a head 65 having side lugs 66 like the lugs 62, and fixed to said head is a spline socket 67 having lugs 68 electrically welded to the lugs 66, the shaft being thus provided with a spline socket terminal. This socket may, as will be understood, be formed with any suitable number of splines and is, of course, broached before being attached to the shaft.

In Figure 19, I have shown the joint shaft 20 as provided with a solid terminal 69. In thus providing the shaft with a solid terminal, said terminal can be formed with any kind of taper, may be round or square, or may be machined with six, eight, or ten splines, or any other approved number of splines, while a solid shaft may be electrically butt-welded to said terminal.

Having thus described the invention, what I claim is:

1. A universal joint including a shell, a shaft extending therein, a core carried by the shaft, shoes slidably coacting with the core and having tapered sockets therein, and pivot pins carried by the shell and pivotally engaging in the sockets in the shoes, the shoes being rotatable on said pins whereby the shaft may rock about the axes of the pins and slidably supporting the core whereby the shaft may rock about an axis extending at a right angle to the axes of said pins.

2. A universal joint including a shell, a shaft extending therein and provided with a yoke, a core fixed in said yoke and provided with a peripheral groove, shoes slidably fitting in said groove, and pivot pins carried by the shell to coact with said shoes, the shoes being adapted to turn on said pins whereby the shaft may rock about the axes of the pins and slidably supporting the core whereby the shaft may rock about an axis at a right angle to the axes of said pins.

3. A universal joint including a shell, a shaft extending therein, a core carried by the shaft, shoes slidably coacting with the core, and pivot pins carried by the shell and rotatably supporting the shoes whereby the shaft may rock about the axes of said pins and may also rock about an axis at a right angle to the axes of said pins, the pins being adjustable for taking up play in the direction of the axes of the pins.

4. A universal joint including a shell, a shaft, extending therein, a core carried by the shaft, shoes slidably coacting with the core, pivot pins carried by the shell to coact with the shoes, the shoes being rotatable on said pins whereby the shaft may rock about the axes of said pins and slidably supporting the core whereby the shaft may rock about an axis at a right angle to the axes of the pins, and lubricant packings carried by the core and disposed to be compressed by said shoes as the shaft is rocked about the latter axis.

5. A universal joint comprising a shell, a bearing cup within the shell having a concave bearing surface of uniform contour, an annular bearing cup within the shell opposite the first mentioned cup, a shaft extending into the shell through the annular bearing cup, means upon the shaft coacting with the said annular bearing cup to guide the shaft for substantially universal angular movement, a yoke upon the shaft, coacting means carried by the yoke and the shell connecting the shell and the shaft for rotation in unison, and a bearing element upon the yoke having a convex surface coacting with the first mentioned bearing cup.

6. A universal joint comprising a shell, a bearing cup within the shell, a shaft extending into the shell and having a bearing portion coacting with the said cup to guide the shaft for substantially universal angular movement, a core upon the shaft having guiding grooves therein, shoes slidably mounted in the grooves, pivot elements carried by the shell and coacting with the said shoes, and yieldable packing in said grooves at the opposite ends of the shoes.

7. A universal joint comprising a shell, a bearing cup within the shell, a shaft extending into the shell and having a bearing portion coacting with the said cup to guide the shaft for substantially universal angular movement, a core upon the shaft having guiding grooves therein, shoes slidably mounted in the grooves, pivot elements carried by the shell and coacting with the said shoes, yieldable packing in said grooves at the opposite ends of the shoes, and means upon the shaft opposing the ends of the shoes and constituting an abutment for the packing.

8. A universal joint comprising a shell, opposed bearing members in said shell, a shaft extending into the shell and having spaced bearing portions coacting with the bearing members to support the shaft for substantially universal angular movement with respect to the shell, and means connecting the shell and shaft for rotation in unison, the said means comprising a yoke upon the shaft between the said bearing portions, a core removably supported in the yoke and having a circumferential groove, shoes fitting in the groove and disposed at opposite sides of the core, and pivot elements fixed with relation to the shell and axially alined and engaging said shoes.

In testimony whereof I affix my signature.

MAXWELL W. WYSONG. [L. S.]